(12) United States Patent
Yamauchi et al.

(10) Patent No.: US 7,646,982 B2
(45) Date of Patent: Jan. 12, 2010

(54) CHROMATIC DISPERSION COMPENSATOR

(75) Inventors: Yasuhiro Yamauchi, Kawasaki (JP);
Hirohiko Sonoda, Yokohama (JP);
Hiroyuki Furukawa, Kawasaki (JP);
Yoshinobu Kubota, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 369 days.

(21) Appl. No.: 11/320,426

(22) Filed: Dec. 29, 2005

(65) Prior Publication Data

US 2006/0198024 A1 Sep. 7, 2006

(30) Foreign Application Priority Data

Mar. 4, 2005 (JP) ............... 2005-060805

(51) Int. Cl.
*H04B 10/12* (2006.01)
*H04J 14/02* (2006.01)

(52) U.S. Cl. .................. 398/147; 398/159; 398/81; 359/337.5

(58) Field of Classification Search ........... 398/147, 398/158, 159, 148, 81; 359/337.5, 578, 584, 359/589, 615
See application file for complete search history.

(56) References Cited

U.S. PATENT DOCUMENTS

| | | | |
|---|---|---|---|
| 5,930,045 A | 7/1999 | Shirasaki | 359/577 |
| 5,959,773 A * | 9/1999 | Gagnon | 359/495 |
| 5,969,865 A | 10/1999 | Shirasaki | 359/577 |
| 6,646,805 B2 * | 11/2003 | Mitamura et al. | 359/578 |
| 6,909,537 B2 | 6/2005 | Kawahata et al. | 359/337.5 |
| 2003/0185504 A1 * | 10/2003 | Yamauchi et al. | 385/27 |

FOREIGN PATENT DOCUMENTS

| | | |
|---|---|---|
| JP | 2000-511655 | 9/2000 |
| JP | 2002-514323 | 5/2002 |
| JP | 2003-207618 | 7/2003 |
| JP | 2003-294999 | 10/2003 |

\* cited by examiner

*Primary Examiner*—M. R. Sedighian
(74) *Attorney, Agent, or Firm*—Staas & Halsey

(57) ABSTRACT

A chromatic dispersion compensator of present invention includes a high-refractive-index VIPA plate, a three-dimensional mirror, and a control unit. The high-refractive-index VIPA plate is made of a material such as silicon having a refractive index higher than that of optical glass and is able to output incident lights toward different directions according to wavelength. The three-dimensional mirror reflects the light of each wavelength emitted from the high-refractive-index VIPA plate, at a predetermined position and returns the light to the VIPA plate. The control unit controls a temperature of the high-refractive-index VIPA plate at a constant level while controlling the position of the three-dimensional mirror corresponding to a chromatic dispersion compensation amount. Thereby, larger chromatic dispersion can be compensated while a decrease in transmission bandwidth is suppressed.

10 Claims, 8 Drawing Sheets

CHROMATIC DISPERSION COMPENSATOR

BACKGROUND OF THE INVENTION (1) Field of the Invention

The present invention relates to a chromatic dispersion compensator which compensates chromatic dispersion accumulated in a light signal propagating through an optical fiber transmission line in a field of optical communication, particularly to the chromatic dispersion compensator which generates the variable chromatic dispersion by utilizing an optical component provided with a function of demultiplexing an input light according to a wavelength.

(2) Related Art

For example, the conventional chromatic dispersion compensator includes one in which a so-called Virtually Imaged Phased Array (VIPA) is utilized (for example, see Japanese Patent Application Laid-Open (JP-A) No. 2000-511655 and JP-A No. 2002-514323). VIPA demultiplexes a Wavelength Division Multiplexing (WDM) light into plural light fluxes, which can spatially be identified according to the wavelengths.

FIG. 8 is a perspective view showing a configuration example of the conventional VIPA type chromatic dispersion compensator. FIG. 9 is a top view of the configuration example shown in FIG. 8.

As shown in the drawings, in the conventional VIPA type chromatic dispersion compensator, for example, after an emitted light from one end of optical fiber 130 through an optical circulator 120 is converted into parallel light with a collimating lens 140, the light is focused onto one line segment with a line focusing lens 150, and the light is incident to a space between parallel planes opposing each other through a light entrance window 116 of a VIPA plate 110. The light incident to the VIPA plate 110 is repeatedly multiply reflected between a reflection multilayer film 112 and a reflection multilayer film 114. The reflection multilayer film 112 is formed on one of planes of the VIPA plate 110, and the reflection multilayer film 112 has reflectance lower than 100%. The reflection multilayer film 114 is formed on the other plane, and the reflection multilayer film 114 has the reflectance of about 100%. At this point, the several-percent of light is transmitted through the reflection plane and emitted to the outside of the VIPA plate 110 in each reflection on the surface of the reflection multilayer film 112.

The lights transmitted through the VIPA plate 110 interfere with one another to form plural light fluxes having the different traveling directions according to the wavelengths. As a result, when the light fluxes are focused on one point with a lens 160, the focal position of each light flux is moved on a straight line according to a change in wavelength. The lights, emitted from the VIPA plate 110 and focused with the lens 160, are reflected at different positions on a three-dimensional mirror 170 according to the wavelengths and returned to the VIPA plate 110 by arranging the three-dimensional mirror 170. The lights reflected from the three-dimensional mirror 170 travel in the different directions depending on the wavelengths, and optical paths of the lights are shifted when the lights are returned to the VIPA plate 110. The different wavelength components propagate through different distances by changing the optical path shift amount according to the wavelengths, which performs the chromatic dispersion compensation of the input light.

Thus, when a model shown in FIG. 10 is considered, behavior of the light which is multiply reflected with the VIPA plate 110 is similar to the light in a well-known Echelon grating which is of a step-shaped diffraction grating. Therefore, it can be considered that the VIPA plate 110 is a virtual diffraction grating. In consideration of interference conditions at the VIPA plate 110, as shown in right side of FIG. 10, upper sides of the emitted lights interfere on the condition of a short wavelength based on an optical axis and lower sides interfere on the condition of a long wavelength, so that short wavelength components of the light signals having the wavelengths are emitted onto the upper side and long wavelength components are emitted onto the lower side. The conventional VIPA type chromatic dispersion compensator has advantages in that the chromatic dispersion can be compensated over a wide range, the wavelength (transmission wavelength) of the light signal to be compensated can be changed by adjusting of the VIPA plate 110 to shift a transmission band of the periodically-generated light in a wavelength axis direction, and the like.

Further, for the conventional VIPA type chromatic dispersion compensator, for example, there is also known a technology in which flattening of the transmission band of the light is performed by utilizing a spatial filter having a two-dimensionally variable transmission loss property or by two-dimensionally changing the reflectance of the reflection plane of the three-dimensional mirror 170 (for example, see JP-A No. 2003-207618). There is also proposed a technology in which flattening of the transmission band is achieved by changing an angle of the three-dimensional mirror 170 according to the wavelength to change reflection efficiency (for example, see JP-A No. 2003-294999).

In the conventional VIPA type chromatic dispersion compensator, sometimes it is desired that the larger chromatic dispersion can be compensated. However, in principle, the VIPA type chromatic dispersion compensator has a characteristic that, when a chromatic dispersion compensation amount (absolute value) is increased, widths of the transmission bands periodically generated are decreased and transmission light loss is increased, so that there is a problem that the compensable chromatic dispersion amount is restricted.

The reason why the increase in chromatic dispersion compensation amount decreases the transmission bandwidth in the VIPA type chromatic dispersion compensator will briefly be described. For example, as shown in FIG. 11, when the light signal having a central wavelength $\lambda_C$ is incident to a light entrance window 116 of the VIPA plate 110, the component having the central wavelength $\lambda_C$ of the light multiply reflected between the parallel planes wavelength $\lambda_C$ is emitted from the VIPA plate 110 according to an intensity distribution I1 in which intensity is attenuated as the number of the multiple reflection times is increased. Then, the light having the central wavelength $\lambda_C$ is reflected by the three-dimensional mirror 170 through the convergent lens 160 and returned to the VIPA plate 110. The light having a central wavelength $\lambda_C$ is incident to the VIPA plate 110 again while having an intensity distribution I2 which is symmetrical to the intensity distribution I1 of the emitted light, and the light is multiply reflected. Then, the light is emitted from the light entrance window 116. At this point, the intensity of the light (transmission light) having the central wavelength $\lambda_C$ emitted from the light entrance window 116 can conceptually be expressed by a shaded area where the intensity distributions I1 and I2 overlap each other.

As shown in FIG. 12, during negative dispersion compensation, in the light on a short wavelength $\lambda_S$ side included in the light signal, an intensity distribution I2' of the light returned to the VIPA plate 110 is shifted upward as described in FIG. 12 with respect to the light of the central wavelength $\lambda_C$ according to a reflection position at the three-dimensional mirror 170, so that the area where the intensity distributions I1 and I2' overlap each other is decreased. Therefore, the transmittance of the light on the short wavelength $\lambda_S$ side is decreased, i.e., loss is increased.

As shown in FIG. 13, during the negative dispersion compensation, in the light on a long wavelength $\lambda_L$ side included in the light signal, an intensity distribution I2" of the light returned to the VIPA plate 110 is shifted downward in FIG. 13 however the shift amount is small compared with the short wavelength $\lambda_S$ side, so that the transmittance is decreased. When the chromatic dispersion compensation amount (absolute value) is increased, because the shift amount upward the short wavelength $\lambda_S$ side and the shift amount downward the long wavelength $\lambda_L$ side are increased respectively, the transmittance on the short wavelength $\lambda_S$ side with respect to the central wavelength $\lambda_C$ and the transmittance on the long wavelength $\lambda_L$ side are decreased (the loss is increased). Accordingly, as shown in the upper portion of FIG. 14, as the chromatic dispersion compensation amount (absolute value) is increased, the transmission bandwidth is decreased. A lower portion of FIG. 14 illustrates a relationship between the wavelength and group delay time when the chromatic dispersion compensation amount is varied.

In the configuration of the conventional VIPA type chromatic dispersion compensator, examples of the method of increasing the chromatic dispersion compensation amount include the method of lengthening a distance between the parallel planes of the VIPA plate 110, the method of decreasing an inclination angle of the VIPA plate 110 with respect to the incident light, and the method of increasing a curvature of the reflection plane of the three-dimensional mirror 170.

However, because the distance between the parallel planes of the VIPA plate 110 determines a period (Free Spectral Range (FSR)) in which the transmission band is repeated at constant wavelength (frequency) intervals, it is necessary that the distance between the parallel planes is set at a value corresponding to a wavelength interval (channel interval) of the light signal included in the WDM light to be compensated. It is necessary that the inclination angle of the VIPA plate 110 is set such a value that the light does not go out the VIPA plate 110 through the light entrance window 116 after the light incident from the light entrance window 116 is reflected by the opposing surface 112. Therefore, it is necessary to secure the inclination angle not lower than a predetermined angle, which is determined according to a beam diameter of the incident light, focused by the line focusing lens 150. It is difficult to produce the three-dimensional mirror 170 having the large curvature, and the remarkable decrease in transmission bandwidth occurs in the three-dimensional mirror 170 having the large curvature.

Accordingly, in order to realize the VIPA type chromatic dispersion compensator, which can compensate the larger chromatic dispersion, it is necessary that design is performed in sufficient consideration of the various constraint conditions unique to the configuration of the above VIPA type chromatic dispersion compensator.

Separately from the problem concerning the increase in chromatic dispersion compensation amount, the conventional VIPA type chromatic dispersion compensator has also the following problem concerning temperature control of the VIPA plate.

In the conventional VIPA type chromatic dispersion compensator, practically, in order that the wavelength band of each channel included in the WDM light to be compensated is included in the transmission band periodically generated, the periodic transmission band is optimized by controlling a temperature of the VIPA plate 110 to change the optical path length. Usually, as shown in FIG. 15, for the transmission band corresponding to one channel in the periodic transmission band, the temperature of the VIPA plate 110 is controlled such that a 3-dB central wavelength coincides with the central wavelength of the light signal. The 3-dB central wavelength is the central wavelength when a range in which the transmittance is decreased from the maximum value by 3 dB is set at the transmission band.

As shown in FIG. 14, in the conventional VIPA type chromatic dispersion compensator, since the spectral shape of the transmission band is largely changed when the chromatic dispersion compensation amount is changed, in each setting change of the chromatic dispersion. compensation amount, it is necessary that the transmission band is adjusted by controlling the temperature of the VIPA plate 110

Because the reflection position of the light is changed by moving the three-dimensional mirror 170, so that it takes a relatively short time to change the setting of the chromatic dispersion compensation amount. On the other hand, in the temperature control of the VIPA plate 110, because optical glass used for the VIPA plate has a small temperature coefficient of a refractive index of (for example, the temperature coefficient of the refractive index of BK7 which is of the typical optical glass is $2.2\times10^{-6}$ ($1/°$ C.)), there is a problem that a long time is required to adjust the wavelength in association with the setting change of the chromatic dispersion compensation amount.

SUMMARY OF THE INVENTION

In view of the foregoing, an object of the invention is, for the chromatic dispersion compensator in which VIPA is utilized, to easily realize the temperature control of VIPA for optimizing the transmission band while the larger chromatic dispersion can be compensated by suppressing the decrease in transmission bandwidth.

In order to achieve the above object, a chromatic dispersion compensator of the invention includes an optical component which includes an element having two parallel reflection planes opposing each other, the optical component having a demultiplexing function, in which a light focused in a one-dimensional direction is incident to a space between the reflection planes, a part of the incident light is transmitted through and emitted from one of the reflection planes while multiply reflected between the reflection planes, and light fluxes having different traveling directions is formed according to wavelengths by interference of the emitted lights; a reflector which reflects the light fluxes having the wavelengths, the light fluxes being emitted from one of the reflection planes of the optical component toward the different directions, the reflector returning the light fluxes to the optical component; and a reflection position control unit which controls a position of the reflector corresponding to a chromatic dispersion compensation amount, wherein, the element of the optical component is made of a material having a refractive index higher than that of optical glass.

In the chromatic dispersion compensator of the invention, the optical component having the function of demultiplexing the input light according to the wavelengths, i.e., the element constituting VIPA is made of the material having the refractive index higher than that of the optical glass. Therefore, since the number of reflection times per unit length is increased in the light, which is multiply reflected between the parallel reflection planes opposing each other, the effective optical path length is lengthened in the optical component.

According to the chromatic dispersion compensator of the invention, the chromatic dispersion having the large absolute value can be compensated while the decrease in transmission bandwidth is suppressed.

Further, since the change in transmission band is decreased when the chromatic dispersion compensation amount is varied, the temperature control of the optical component can easily be performed when the chromatic dispersion is changed.

The other objects, features, and advantages of the invention will become apparent from the following description of embodiments with reference to the accompanying drawings.

DETAILED DESCRIPTION OF THE INVENTION

A preferred embodiment of the invention will be described below with reference to the accompanying drawings. In all the following drawings, the same numeral shall designate the same or corresponding component.

Figure 1:
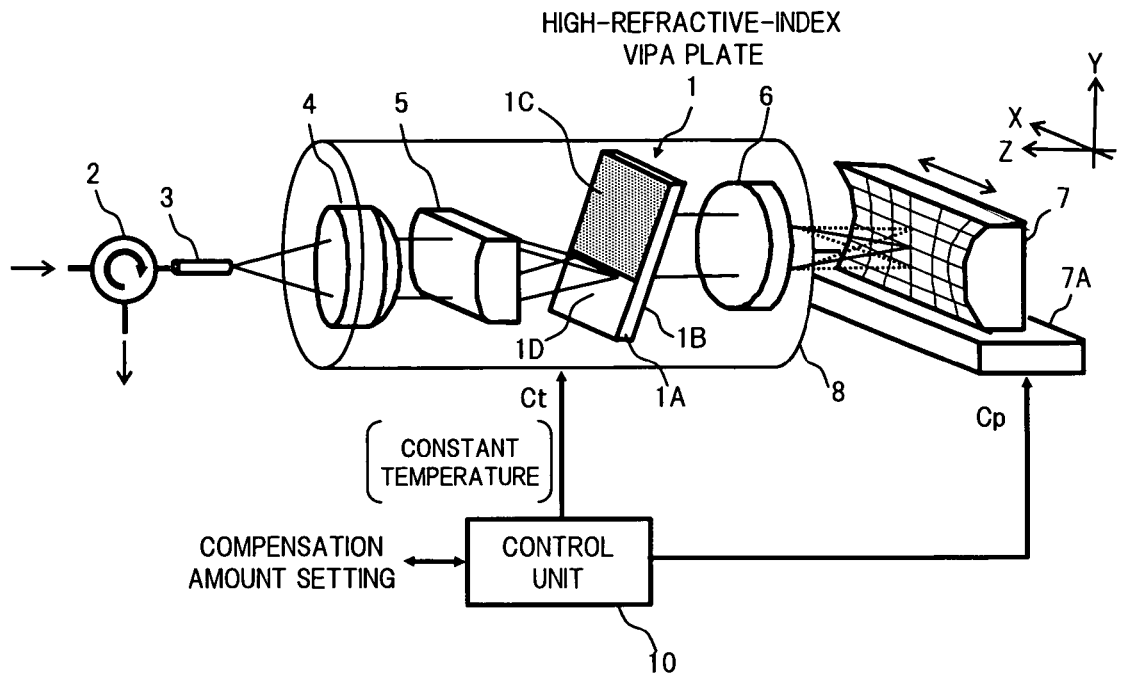
FIG. 1 shows a configuration of a chromatic dispersion compensator according to an embodiment of the invention.

FIG. 1 shows a configuration of a chromatic dispersion compensator according to an embodiment of the invention.

Referring to FIG. 1, the chromatic dispersion compensator of the embodiment includes a high-refractive-index VIPA plate 1, an optical circulator 2, an optical system, a convergent lens 6, a three-dimensional mirror 7, a case 8, and a control unit 10. The high-refractive-index VIPA plate 1 is an element, which has two parallel reflection planes opposing each other. The optical circulator 2 enables the light signal to be incident to a light entrance window 1D of the high-refractive-index VIPA plate 1 while the light signal is focused onto one line segment. The optical system includes the optical fiber 3, collimating lens 4, and the line focusing lens 5. The light flux is multiply reflected in the high-refractive-index VIPA plate 1, and the light flux is emitted from one of the parallel planes and inputted to the convergent lens 6. The convergent lens 6 focuses the light flux on one point. The three-dimensional mirror 7 is a reflector, which reflects the light focused with the convergent lens 6 and returns the light to the high-refractive-index VIPA plate 1 through the convergent lens 6. The required optical components including the high-refractive-index VIPA plate 1 are accommodated in the case 8. The control unit 10 controls a position of the three-dimensional mirror 7 and a temperature of the high-refractive-index VIPA plate 1.

The high-refractive-index VIPA plate 1 includes a substrate 1A, a reflection multilayer film 1B, a reflection multilayer film 1C, and a light entrance window 1D. The substrate 1A has parallel planes opposing each other. The reflection multilayer film 1B is formed on one of the parallel planes of the substrate 1A, and the reflection multilayer film 1C is formed on the other parallel plane. The high-refractive-index VIPA plate 1 is inclined by a required angle with respect to an angle at which the optical axis of the light incident to the light entrance window 1D becomes normal incidence.

A material satisfying the following conditions is used as the substrate 1A:
- the material is transparent within the wavelength band (service wavelength band) of the light signal to be compensated (small absorption),
- the material is an isotropic material and birefringence is not generated,
- the material can be formed in a parallel plate having higher flattening by polishing or the like (good workability),
- the material has high optical evenness (a fluctuation in refractive index is small in the material),
- the film can be deposited on the polished surface,
- the material has high heat resistance and high humidity resistance, and
- the material has the refractive index higher than that of the optical glass.

In this case, for example, silicon (Si) is used as the material satisfying the above conditions. Silicon is transparent to the light signal having the wavelength band generally used for the optical fiber communication, and the refractive index of the silicon is 3.2 for the light having the wavelength of 1550 nm. Although the various kinds of optical glass having various compositions are used in the conventional VIPA plate, the material having the refractive index larger than 2 for the light having the wavelength around 1550 nm is not known so far. For example, in BK7 (borosilicate glass), which is of the typical optical glass, the refractive index is 1.5 for the light having the wavelength of 1550 nm. The refractive index of silicon is sufficiently higher than the refractive index of the conventional optical glass. Further, when compared with the optical glass, silicon has a smaller coefficient of linear expansion (Si: $2.6 \times 10^{-6}$ (1/° C.), BK7: $7.2 \times 10^{-6}$ (1/° C.)), and silicon is a stable material because a change in shape is small for the temperature change.

In the embodiment, silicon is used as the material of the substrate 1A. However, the substrate material, which can be applied to the invention, is not limited to silicon, but an arbitrary material satisfying the above conditions can be used as the substrate 1A. Zinc selenide (ZeSe) can be cited as an example of the substrate material other than silicon. Zinc selenide has the refractive index of 2.5 at the wavelength of 1550 nm.

The reflection multilayer film 1B has reflectance lower than 100% (preferably range of about 95% to about 98%) with respect to the light signal incident through the light entrance window 1D. The reflection multilayer film 1B is formed on a whole area of one of the planes of the substrate 1A. The reflection multilayer film 1C has reflectance of about 100% with respect to the light signal incident through the light entrance window 1D. The reflection multilayer film 1C is partially formed on the other plane of the substrate 1A. In the other plane of the substrate 1A, a portion where the reflection multilayer film 1C is not formed becomes the light entrance window 1D, which is transparent to the light signal.

The optical circulator 2 is the general optical component having, for example, three ports. The optical circulator 2 transmits the light in the direction a first port toward a second port, in the direction from the second port toward a third port, and in the direction from the third port toward the first port. In this case, the light signal inputted to the chromatic dispersion compensator of the embodiment is imparted to the first port of the optical circulator 2, the light signal is sent to one end of the optical fiber 3 through the second port, and the light signal returned to the other end of the optical fiber 3 is emitted as the output light of the chromatic dispersion compensator of the embodiment from the third port through the second port.

In the optical fiber 3, one end of a single-mode fiber or the like is connected to the second port of the optical circulator 2, and the other end is arranged near the collimating lens 4. However, the type of the optical fiber 3 is not limited to those described above.

The collimating lens 4 is a general lens, which converts the emitted light from the optical fiber 3 into the parallel light to impart the parallel light to the line focusing lens 5.

The line focusing lens 5 is a lens which focuses the parallel light from the collimating lens 4 onto one line segment. Specifically, a cylindrical lens, a graded index lens, and the like can be used as the line focusing lens 5.

The convergent lens 6 is a general lens, which focuses the plural light fluxes onto one point respectively. The plural light fluxes are multiply reflected with the high-refractive-index VIPA plate 1 and emitted from the side of reflection multilayer film 1B. The plural light fluxes interfere with one another, and traveling directions differ from one another depending on the wavelength.

The three-dimensional mirror 7 has, for example, a three-dimensional structure in which surface shape is aspherical. A central axis, which is of a design reference, exists on the aspherical mirror. The three-dimensional mirror 7 is placed on a moving stage 7A, and the three-dimensional mirror 7 is arranged such that a running axis of the moving stage 7A becomes parallel to the direction of the central axis (X-axis direction in FIG. 1). The moving stage 7A can run in the X-axis direction by driving a pulse motor (not shown) or the like according to a control signal Cp emitted from the control unit 10. In this case, an optical axis direction of the light signal entering the high-refractive-index VIPA plate 1 is set as a Z-axis, the direction perpendicular to an angle dispersion direction of the light emitted from the high-refractive-index VIPA plate 1 is set as a X-axis, and the direction parallel to the angle dispersion direction of the light is set as a Y-axis.

For example, the case 8 is a cylindrical container in which a film heater (not shown) is provided in a side face. In this case, the collimating lens 4, the line focusing lens 5, the high-refractive-index VIPA plate 1, and the convergent lens 6 are accommodated at predetermined positions inside the container. In the film heater, the operation is controlled according to a control signal Ct from the control unit 10.

The control unit 10 outputs the control signal Cp to the moving stage 7A. The control signal Cp moves the three-dimensional mirror 7 at the predetermined position according to a setting value, inputted from the outside or the like, of the chromatic dispersion compensation amount. The control unit 10 outputs the control signal Ct to the film heater irrespective of the setting value of the chromatic dispersion compensation amount. The control signal Ct keeps the temperature of the high-refractive-index VIPA plate 1 constant. It is assumed that information on the position of the three-dimensional mirror 7 corresponding to the setting value of the chromatic dispersion compensation amount is previously stored in a memory (not shown) or the like.

Then, an action of the chromatic dispersion compensator of the embodiment will be described.

In the chromatic dispersion compensator having the above configuration, the WDM light, which propagates through the optical fiber transmission line to generate the chromatic dispersion is inputted to the first port of the optical circulator 2, and the WDM light is sent to the optical fiber 3 through the second port of the optical circulator 2. After the WDM light emitted from the optical fiber 3 is converted into the parallel light with the collimating lens 4, the WDM light is focused on one line segment with the line focusing lens 5, and the WDM light is incident to a space between the parallel planes opposing each other in the high-refractive-index VIPA plate 1 which is controlled at constant temperature by the control unit 10.

The light incident to the high-refractive-index VIPA plate 1 is repeatedly multiply reflected between the reflection multilayer films 1B and 1C formed on the parallel planes of the substrate 1A. The several-percent WDM light is transmitted through the reflection plane in each time when the WDM light is reflected from the surface of the reflection multilayer film 1B, and the transmitted light is emitted to the outside of the high-refractive-index VIPA plate 1. At this point, in the optical path of the light propagating through the high-refractive-index VIPA plate 1, as shown in the left side of FIG. 2, the number of reflection times per unit length is increased when compared with the optical path (right side of FIG. 2) in which the conventional optical glass is used, because silicon having the refractive index higher than that of the optical glass is used as the material of the substrate 1A. Therefore, the effective optical path length is lengthened inside the high-refractive-index VIPA plate 1. That the effective optical path length is lengthened will be described in detail later.

Figure 10:
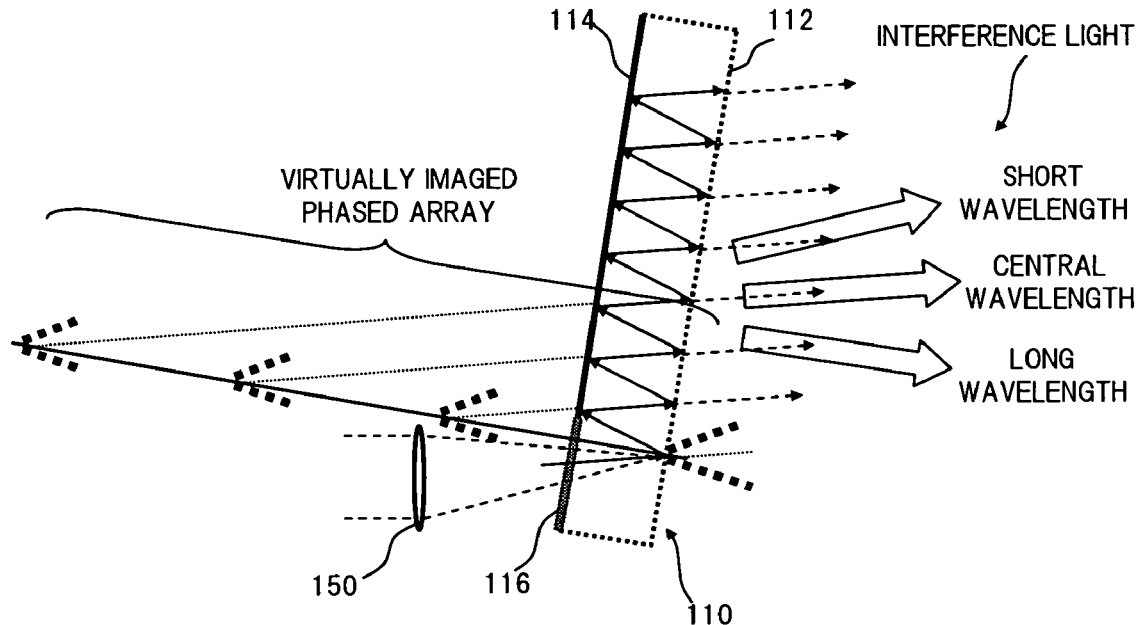
FIG. 10 is a view showing a model for explaining an operation principle of VIPA.

The lights emitted from the side of the reflection multilayer film 1B of the high-refractive-index VIPA plate 1 interfere with one another to form the plural light fluxes having the different traveling directions according to the wavelengths (FIG. 10). The light flux of each wavelength is focused with the convergent lens 6 and reflected at positions, which are different from one another in the Y-axis direction on the reflection plane of the three-dimensional mirror 7. At this point, the position in the X-axis direction of the three-dimensional mirror 7 is controlled at the predetermined position corresponding to the chromatic dispersion compensation amount by the control unit 10. The light reflected by the three-dimensional mirror 7 proceeds toward the opposite direction to the optical path through which the light propagates before the reflection. The light passes sequentially through the convergent lens 6, the high-refractive-index VIPA plate 1, the line focusing lens 5, the collimating lens 4, and the optical fiber 3, and the light is emitted from the third port of the optical circulator 2. Thereby, for the WDM light inputted to the chromatic dispersion compensator of the embodiment, the WDM light to which the chromatic dispersion compensation is performed to the required amount set according to the position of the three-dimensional mirror 7 is emitted from the chromatic dispersion compensator.

Figure 2:
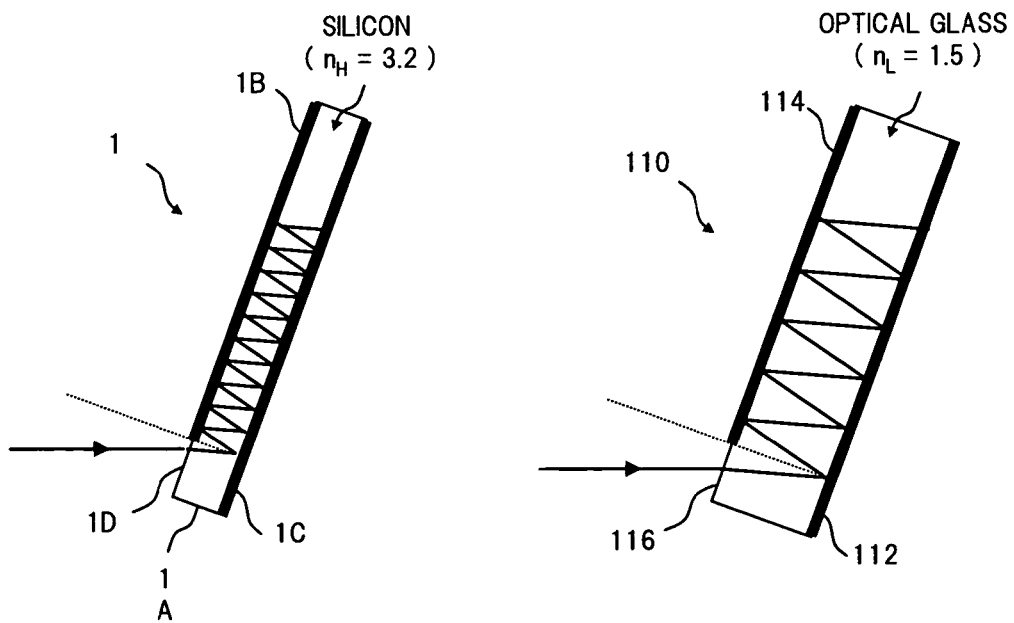
FIG. 2 shows an optical path of a light, which propagates through a high-refractive-index VIPA plate used in the embodiment in comparison with the VIPA plate made of optical glass.

As shown in FIG. 2, since the effective optical path length becomes longer inside the high-refractive-index VIPA plate 1, the larger value can be set at the chromatic dispersion compensation amount in the chromatic dispersion compensator of the embodiment when compared with the conventional configuration in which the optical glass is used as the VIPA plate. Further, since the effective optical path length becomes longer inside the high-refractive-index VIPA plate 1, the decrease in transmission bandwidth can be suppressed even if the larger value is set at the chromatic dispersion compensation amount.

Then, the reason why the decrease in transmission bandwidth can be suppressed by the use of the high-refractive-index VIPA plate 1 even in the high chromatic dispersion compensation will be described in detail.

As described above, the transmission wavelength property of VIPA has the periodicity in which the transmission band having the required bandwidth is repeated at constant wavelength (frequency) intervals. The repeated period is also called "channel interval," "FSR (Free Spectral Range)", or the like. FSR set at the known VIPA type chromatic dispersion compensator typically ranges from 100 GHz to 200 GHz, and other values also exist practically. FSR of VIPA is determined by the refractive index of the material used for the VIPA plate, a thickness of the VIPA plate, and reflection angle in the VIPA plate. Accordingly, when the material used for the VIPA plate, a setting value of FSR corresponding to the channel interval of the light signal to be compensated, and the setting of the reflection angle in the VIPA plate are determined, the thickness of the VIPA plate is determined according to the following expression (1):

$$t = c/(2 \cdot n \cdot FSR \cdot \cos\theta_g) \quad (1)$$

Where t is the thickness of the VIPA plate, c is speed of light, n is the refractive index, and $\theta_g$ is the reflection angle in the VIPA plate.

At this point, it is assumed that FSR and the reflection angle $\theta_g$ in the VIPA plate are constant. When two kinds of the materials, i.e., the material having a high refractive index $n_H$ and the material having a low refractive index $n_L$ ($n_H > n_L$) are considered as the material used for the VIPA plate, the thickness of the VIPA plate made of the high-refractive-index material becomes $n_L/n_H$ (<1) fold of the thickness of the VIPA plate made of the low-refractive-index material, and the thickness of the VIPA plate made of the high-refractive-index material becomes thinned. Therefore, the light multiply reflected inside the VIPA plate made of the high-refractive-index material propagates through the path shown in FIG. 2. As can be seen from FIG. 2, the number of reflection times per unit length in a lengthwise direction of the VIPA plate becomes larger when the high-refractive-index material is used. On the other hand, since FSR is kept constant, the high-refractive-index material is equal to the low-refractive-index material in the effective optical path length per one reciprocating in the VIPA plate irrespective of the refractive index.

Accordingly, when the high-refractive-index material is used, the longer effective optical path length can be obtained through the shorter VIPA plate. That is, the larger chromatic dispersion can be generated when the high-refractive-index material is used. In other words, when the light is returned to the same surface after one reciprocating between the parallel planes of the VIPA plate, the optical path shift in the longitudinal direction (lengthwise direction) can be decreased. Therefore, the longer effective optical path length can be secured in a narrow region in the longitudinal direction, and the larger chromatic dispersion can be obtained.

Figure 11:
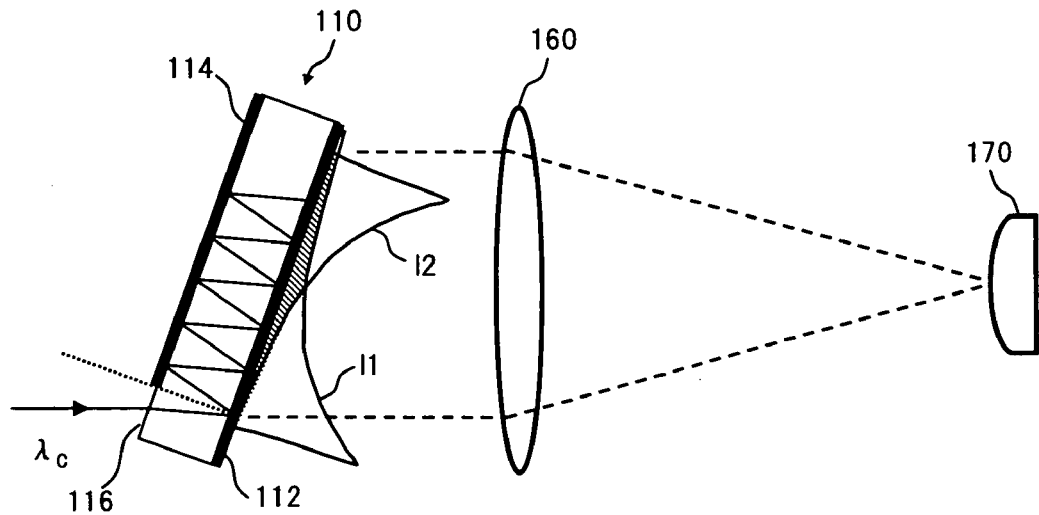
FIG. 11 is a conceptual view for explaining the transmission property for a central wavelength in the conventional chromatic dispersion compensator.
Figure 12:
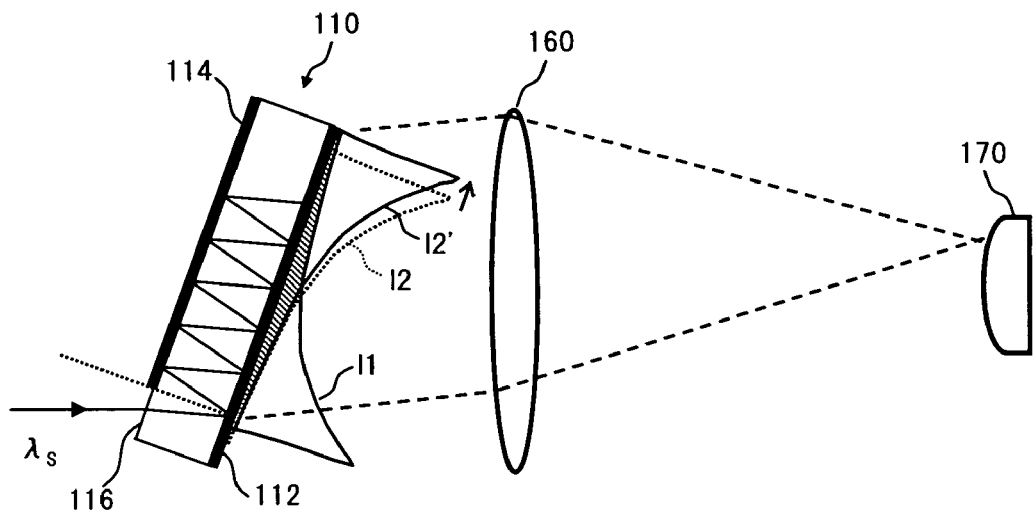
FIG. 12 is a conceptual view for explaining the transmission property for the light on a short wavelength side in negative dispersion compensation of the conventional chromatic dispersion compensator.
Figure 13:
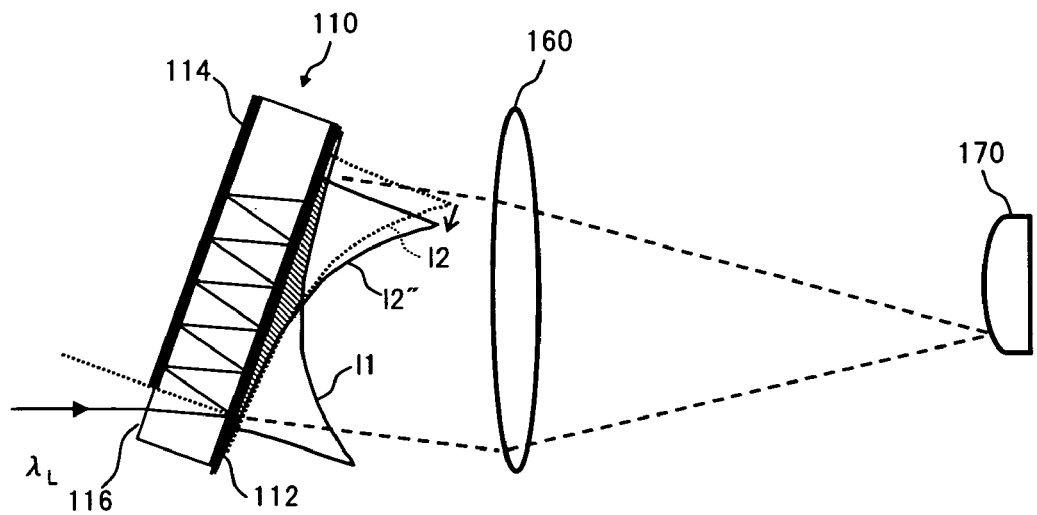
FIG. 13 is a conceptual view for explaining the transmission property for the light on a long wavelength side in the negative dispersion compensation of the conventional chromatic dispersion compensator.
Figure 14:
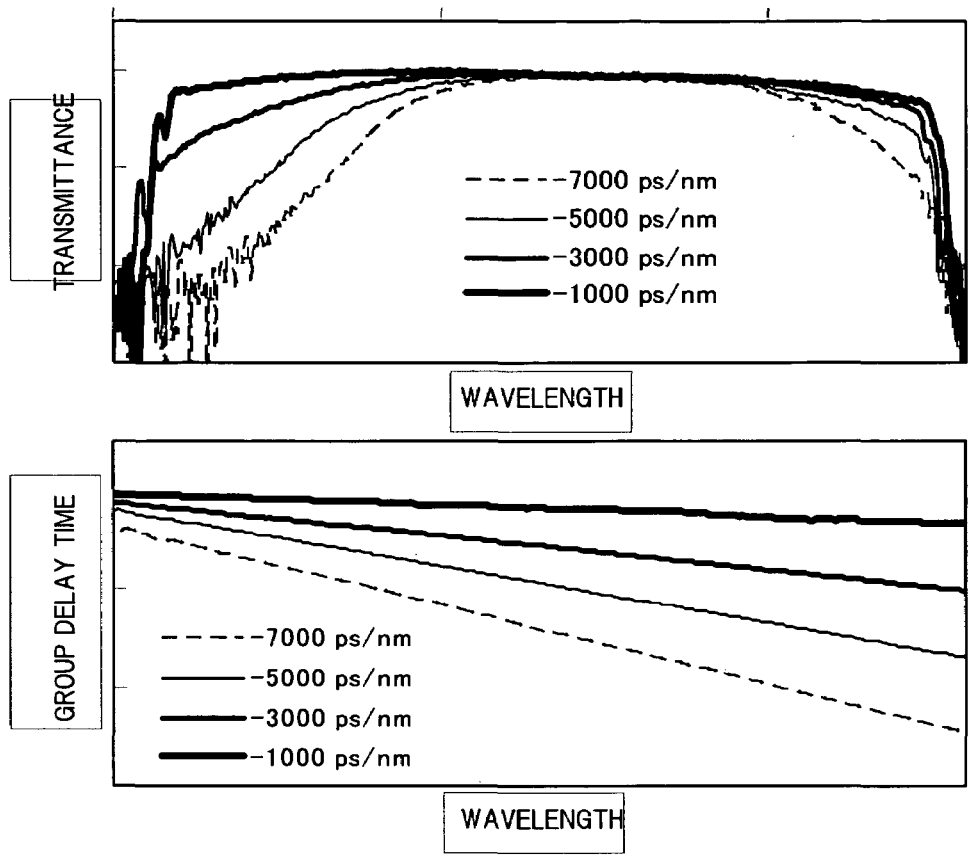
FIG. 14 shows the shape of the transmission band and group delay time in the conventional chromatic dispersion compensator when the chromatic dispersion compensation amount is varied.

At this point, when the light component of each wavelength included in the single channel is reflected by the three-dimensional mirror 7 and returned to the high-refractive-index VIPA plate 1, in order to broaden the transmission bandwidth of the VIPA type chromatic dispersion compensator, it is necessary that the position where the light component is incident to the high-refractive-index VIPA plate 1 again is not largely shifted as compared with the emitted position of the light component. As shown in FIGS. 11 to 13, in the case of the use of the low-refractive-index material such as the optical glass, when the large chromatic dispersion is generated, in order to increase optical path difference between the wavelengths, it is necessary that the light on the short wavelength side in the channel is returned to the upper side of the VIPA plate while the light on the long wavelength side in the channel is returned to the lower side of the VIPA plate. Therefore, the loss is increased between both ends of the single channel, i.e., the transmission band becomes narrow.

On the other hand, in the case of the use of the high-refractive-index material, because the extremely long optical path is included in the narrow region in the longitudinal direction of the VIPA plate, the large optical path difference can be obtained even if the return position is not largely changed. Therefore, the decrease in transmission bandwidth can be suppressed. The difference caused by the refractive index of the material used for the VIPA plate becomes remarkable as the chromatic dispersion compensation amount is increased.

The transmission properties of the VIPA type chromatic dispersion compensator, particularly the transmission bandwidth is sensitive to the shape (for example, surface roughness) of the VIPA plate. When warpage exists in the VIPA plate, the portion which effectively functions for the chromatic dispersion compensation becomes only a part of the longitudinal direction of the VIPA plate. Therefore, similarly to the conventional VIPA plate, it is difficult that the chromatic dispersion compensation amount is increased by increasing the length in the longitudinal direction of the VIPA plate made of the low-refractive-index material. Based on this standpoint, the application of the high-refractive-index material to the VIPA plate is useful in order to increase the chromatic dispersion compensation amount while the decrease in transmission bandwidth is suppressed.

Figure 3:
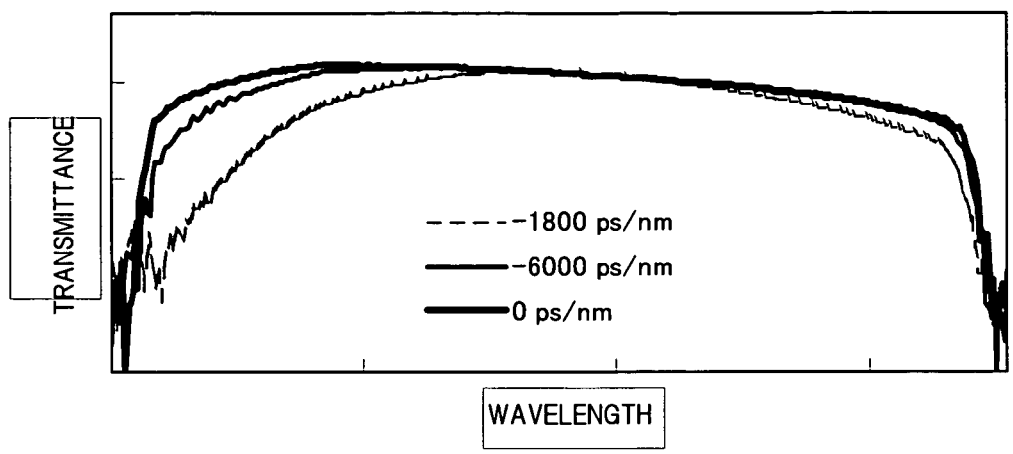
FIG. 3 shows a shape of a transmission band in the embodiment when a chromatic dispersion compensation amount is varied.

FIG. 3 shows a spectral shape for one transmission band of the chromatic dispersion compensator of the embodiment when the chromatic dispersion compensation amount is set at 0 ps/nm, −1800 ps/nm, and −6000 ps/nm respectively. In this way, the effect that the decrease in transmission bandwidth caused by the increase in chromatic dispersion compensation amount (absolute value) can be prevented is also obtained by applying the high-refractive-index VIPA plate 1.

Figure 4:
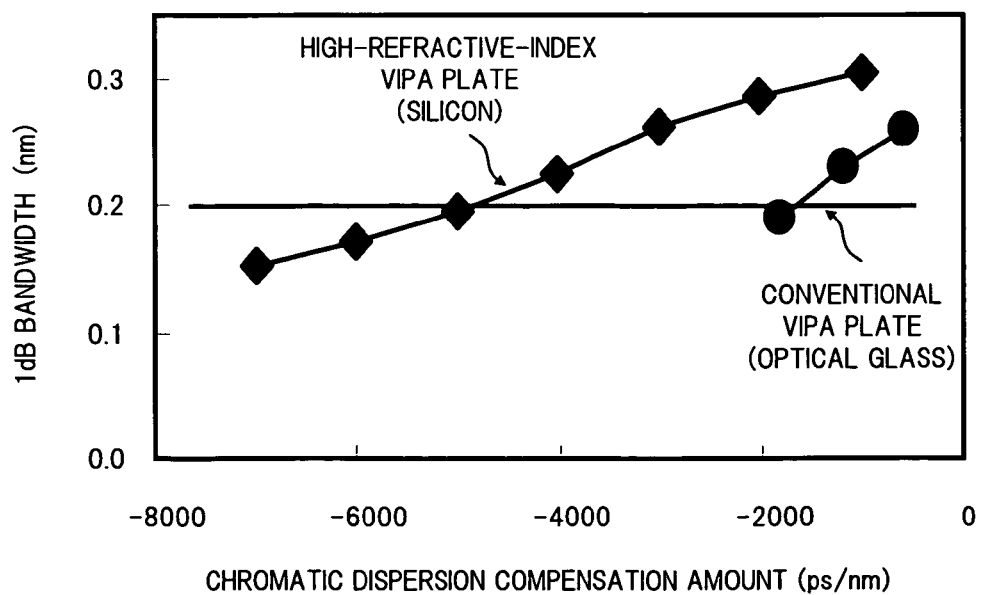
FIG. 4 shows a relationship between the transmission bandwidth and the chromatic dispersion compensation amount in the embodiment in comparison with the VIPA plate made of the optical glass.
Figure 15:
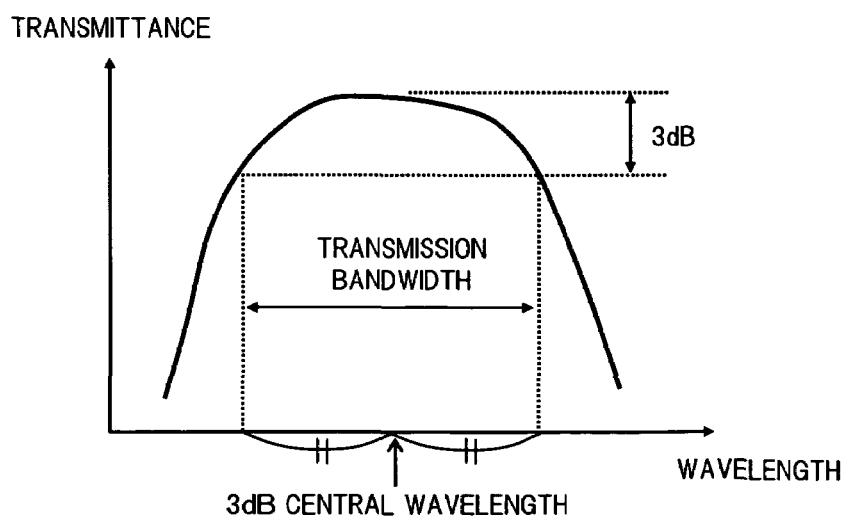
FIG. 15 is a view for explaining optimization of the transmission band corresponding to the chromatic dispersion compensation amount in the conventional chromatic dispersion compensator.

FIG. 4 shows an example of a relationship between a 1-dB bandwidth and the chromatic dispersion compensation amount when the high-refractive-index VIPA plate 1 made of silicon is compared to the VIPA plate made of the conventional optical glass. The 1-dB bandwidth is the wavelength-band width in which the transmittance is decreased from the maximum value by 1 dB (see FIG. 15). From FIG. 4, in the conventional VIPA plate, when the chromatic dispersion amount is decreased from about −1000 ps/nm to about −2000 ps/nm (the absolute value is increased), the 1-dB bandwidth is narrowed lower than 0.2 nm. On the contrary, in the high-refractive-index VIPA plate 1, it is seen that the 1-dB bandwidth of 0.2 nm can be secured up to around the chromatic dispersion amount of −5000 ps/nm. Thus, when compared with the conventional VIPA plate, the larger chromatic dispersion can be compensated by applying the high-refractive-index VIPA plate 1 made of silicon.

Besides the effect that the chromatic dispersion compensation amount having the large absolute value can be set as described above, in the chromatic dispersion compensator in which the high-refractive-index VIPA plate 1 is used, when the chromatic dispersion having the relatively small value is compensated like the conventional VIPA plate, the effect that the broader transmission band can be realized is also obtained. The reason will be described in detail below.

Since VIPA is a kind of diffraction grating as described above, besides the main diffraction order light necessary to demultiplex the input light according to the wavelength, sometimes unnecessary adjacent order diffraction light is also emitted from the VIPA plate. The unnecessary order diffraction light causes disturbance of the main order diffraction light. When the many unnecessary order diffraction lights are emitted, a ratio of which the light is rejected as the unnecessary light is increased in the lights incident to the VIPA plate, which results in the increase in light loss.

Figure 5:
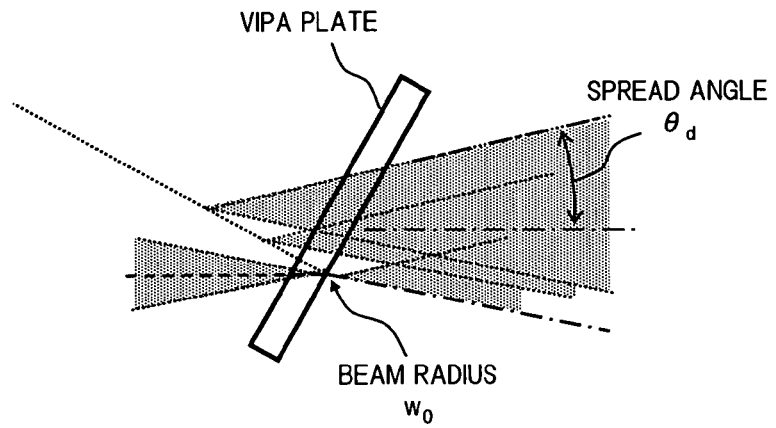
FIG. 5 is a conceptual diagram for explaining a spread angle of the light emitted from the VIPA plate.

As shown in FIG. 5, whether the unnecessary order diffraction light is emitted from the VIPA plate or not depends on whether an unnecessary order diffraction direction is included in the range of a spread angle $\theta_d$ of the emitted light from the VIPA plate or not. On the other hand, magnitude of the spread angle $\theta_d$ of the emitted light is determined by the magnitude (beam radius) $w_o$ of a beam waist which converges on the emitted surface of the VIPA plate when the light is incident to the VIPA plate. Specifically the spread angle $\theta_d$ can approximately be shown by the following expression (2) using the beam radius $w_o$ when the wavelength of the light in the VIPA plate is set at $\lambda$:

$$\theta_d \approx \lambda/(\pi \cdot w_o) \qquad (2)$$

Figure 6:
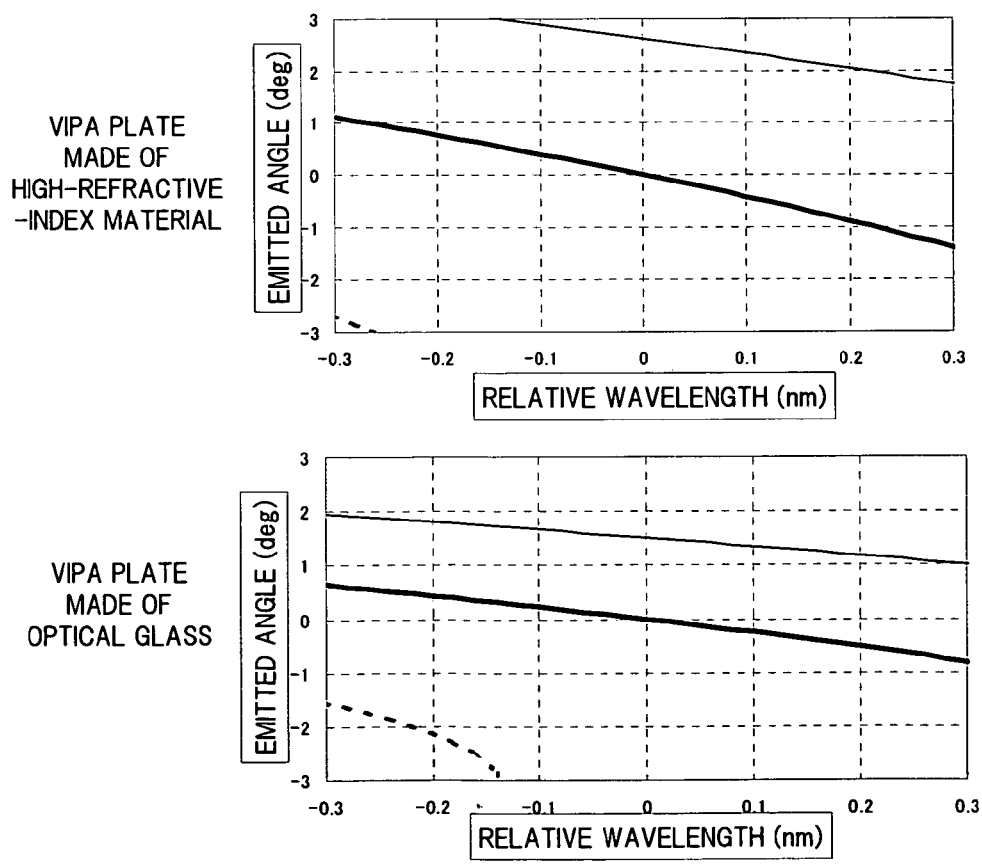
FIG. 6 show computation results of a light emitted angle for the high-refractive-index VIPA plate and the VIPA plate made of the optical glass.

FIG. 6 shows computation results of dependence in the traveling directions of the lights on the wavelength. The lights are emitted from the VIPA plate made of the high-refractive-index material such as silicon and the VIPA plate made of the general optical glass respectively. In this case, the light emitted angle from the high-refractive-index VIPA plate ($n_H$=3.2) and the light emitted angle from the VIPA plate made of the optical glass ($n_L$=1.8) are computed, and the relative wavelength is set at an abscissa axis. A wide line shown in the center of the drawing indicates the emitted direction of the main order light, and a thin line shown in the upper portion of the drawing and a broken line shown in the lower portion indicate the emitted direction of the adjacent unnecessary order light.

As shown in FIG. 6, in the high-refractive-index material, because the main order light is separated from the adjacent unnecessary order light, the traveling direction of the adjacent order light is hardly included in the spread angle $\theta_d$ (see FIG. 5). When the lens configuration of the typical VIPA type chromatic dispersion compensator is used, the spread angle $\theta_d$ becomes about 2°. In this case, for the high-refractive-index VIPA plate shown in the upper side of FIG. 6, the adjacent order light is not included in the spread angle $\theta_d$ over the wide range of −0.3 to +0.2 nm. On the other hand, for the VIPA plate made of the optical glass shown in the lower side, the wavelength range in which the adjacent order light is not included does not exist. Thus, as compared with the conventional VIPA plate made of the optical glass, the adjacent order light has little influence on the high-refractive-index VIPA plate.

Furthermore, as can be seen from the above description, the phenomenon in which the traveling direction of the adjacent order light is included in the spread angle $\theta_d$ of the emitted light from the VIPA plate tends to occur in the wavelength region in the periphery of the wavelength band rather than the central wavelength within the wavelength band of the single channel. Accordingly, it is found that this phenomenon is one of the causes which decrease the transmission bandwidth. However, as described above, since the adjacent order light has little influence on the VIPA plate made of the high-refractive-index material, the transmission bandwidth can be broadened.

In the conventional VIPA plate made of the optical glass, when the spread angle $\theta_d$ is decreased, the influence of the adjacent order light can also be removed. However, in order to realize the decrease in spread angle $\theta_d$, since it is necessary to increase the beam radius $w_o$ of the light incident to the VIPA plate, it is necessary to lengthen the focal length of the line focusing lens. This conflicts with miniaturization of the VIPA type chromatic dispersion compensator. Further, from the viewpoint of optical system stabilization, it is not preferable to enlarge the optical system. As can be seen from the computation result of FIG. 6, in the conventional optical glass, when compared with the high-refractive-index material, since a separation angle between the main order light and the adjacent order light is small, it is difficult to precisely separate the main order light and the adjacent order light. Based on the above standpoints, the VIPA plate made of the high-refractive-index material is more useful rather than the decrease in spread angle $\theta_d$ in the conventional VIPA plate made of the optical glass.

Figure 7:
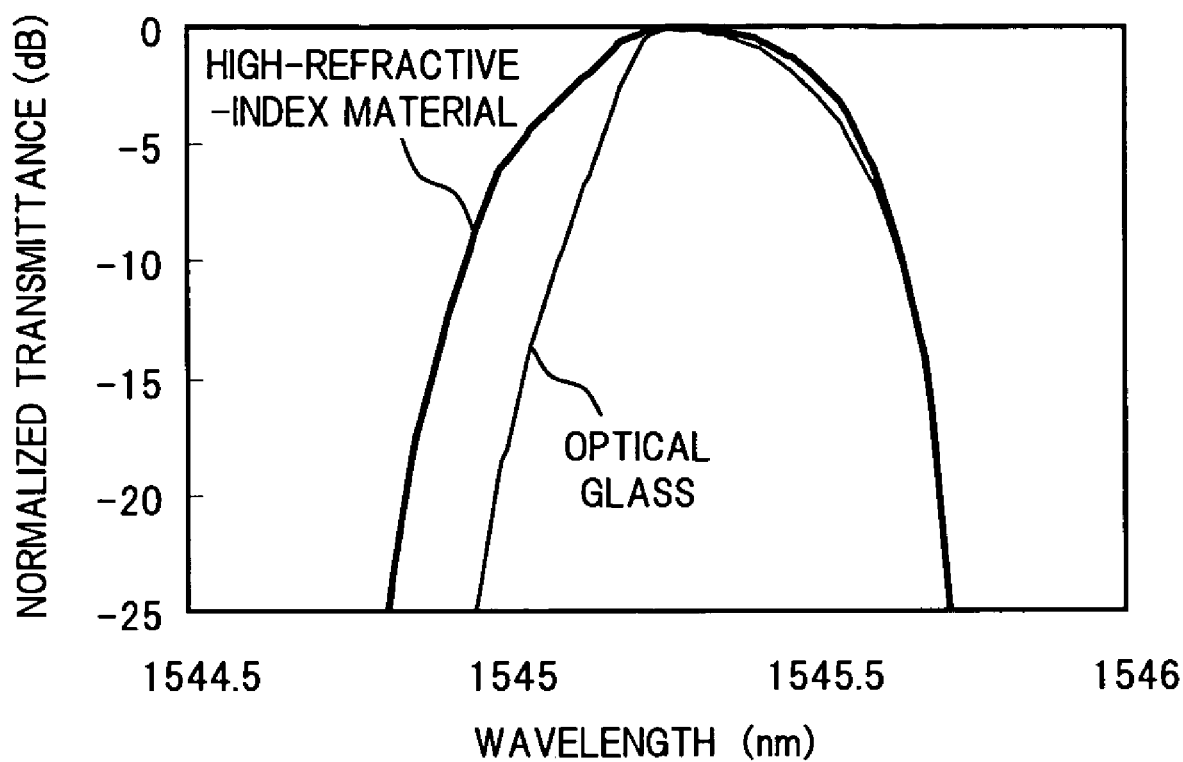
FIG. 7 show computation results of a transmission property when the same chromatic dispersion compensation amount is set for the high-refractive-index VIPA plate and the VIPA plate made of the optical glass.
Figure 8:
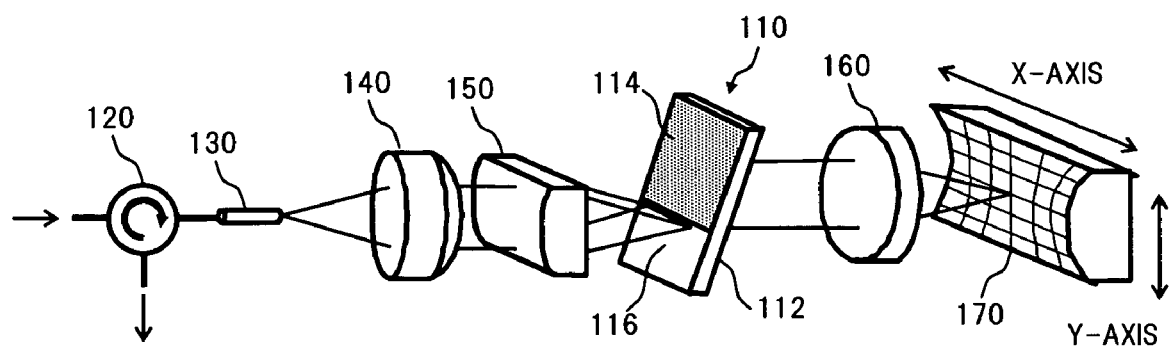
FIG. 8 is a perspective view showing a configuration example of the conventional VIPA type chromatic dispersion compensator.
Figure 9:
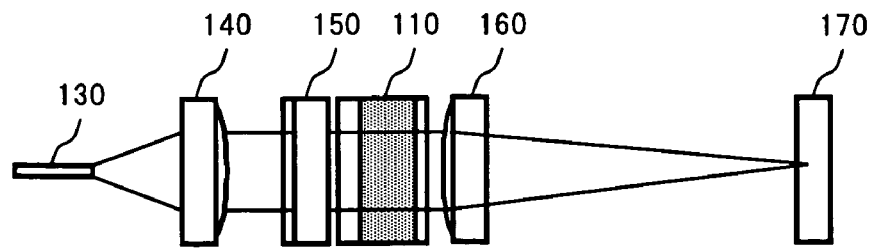
FIG. 9 is a top view of the configuration example shown in FIG. 8.

FIG. 7 show an example of the computation result of the transmission properties when the same chromatic dispersion compensation amount is set for the VIPA plate made of the high-refractive-index material and the VIPA plate made of the optical glass. In this case, for example, the single transmission bands are compared to each other by setting the chromatic dispersion compensation amount of −3000 ps/nm respectively. As can be seen from the computation results of FIG. 7, particularly the decrease in transmittance on the short wavelength side is effectively suppressed by applying the high-refractive-index VIPA plate.

In consideration of other effects which are obtained when the chromatic dispersion compensator of the embodiment is used in the relatively small range of the setting value of the chromatic dispersion compensation amount in association with the effect that the broad transmission band is obtained, the chromatic dispersion compensation equivalent to the conventional VIPA plate can be performed even if the curvature of the reflection plane of the three-dimensional mirror 7 is decreased. Thereby, while the three-dimensional mirror 7 can easily be produced, the decrease in transmission band caused by the inclination in the crosswise direction of the three-dimensional mirror 7 can also be prevented.

Conventionally, the spectral shape is changed when the dispersion compensation amount is changed. Therefore, when the dispersion compensation amount is changed, the temperature of the VIPA plate is changed to perform the control with high accuracy, which allows the central wavelength of the light signal to be compensated to coincide with the central wavelength of the transmission band.

On the other hand, in the chromatic dispersion compensator to which the high-refractive-index VIPA plate 1 is applied, the spectral shape of the transmission band is slightly changed even if the dispersion compensation amount is changed, so that the light signal dispersion can be compensated by keeping the temperature of the VIPA plate constant irrespective of the dispersion compensation amount.

Specifically, depending on the setting range of the envisioned chromatic dispersion compensation amount, the light signal spectrum of the single channel is often included in the transmission band even if the transmission band is shifted by the setting change. In this case, the chromatic dispersion compensation of the desired light signal can be performed by keeping the temperature of the VIPA plate constant irrespective of the dispersion compensation amount. In the configuration of the embodiment shown in FIG. 1, on the assumption of the above case, the control unit 10 shall control the high-refractive-index VIPA plate 1 at constant temperature In the case where the high-refractive-index VIPA plate 1 is applied, as with the conventional VIPA plate, obviously it is also possible that the temperature of the high-refractive-index VIPA plate 1 is controlled according to the setting value of the chromatic dispersion compensation amount (different from the temperature-constant control) to perform the adjustment of the transmission band. In this case, when compared with the optical glass, silicon has a larger temperature coefficient of the refractive index (Si: $160 \times 10^{-6}$ ($1/^\circ$ C.), BK7: $2.2 \times 10^{-6}$ ($1/^\circ$ C.)), so that the refractive index can be changed at high speed by the temperature control. Therefore, the time required for optimizing control of the temperature can be shortened in the high-refractive-index VIPA plate 1 than ever before.

In both the case where the high-refractive-index VIPA plate 1 is controlled at constant temperature and the case where the high-refractive-index VIPA plate 1 is controlled at the optimum value, there is also the effect that the influence of thermal expansion can be suppressed by using silicon as the substrate material of the high-refractive-index VIPA plate 1 to increase the refractive index. The influence of the thermal expansion is increased when the effective optical path length is shortened. That is, when the refractive index of the substrate material of the VIPA plate is increased, the change in optical path length caused by the change in thermal expansion of the substrate material is increase, which easily generates the fluctuation in transmission-band period (FSR) for the fluctuation in temperature. However, as described above, when compared with the optical glass, silicon has the smaller coefficient of linear expansion (Si: $2.6 \times 10^{-6}$ ($1/^\circ$ C.), BK7: $7.2 \times 10^{-6}$ ($1/^\circ$ C.)), so that the change in shape is small for the temperature change in silicon. Thereby, the distance between the parallel planes of the high-refractive-index VIPA plate 1 is hardly changed by the temperature, the period (FSR) of the transmission band can further be stabilized.

What is claimed is:

1. A chromatic dispersion compensator comprising:
an optical component which includes an element having two parallel reflection planes opposing each other, the optical component having a demultiplexing function, in which a light focused in a one-dimensional direction is incident to a space between the reflection planes, a part of the incident light is transmitted through and emitted from one of the reflection planes while multiply reflected between the reflection planes, and light fluxes having different traveling directions are formed according to wavelengths by interference of the emitted lights;
a reflector which reflects the light flux of each wavelength, the light fluxes being emitted from one of the reflection planes of the optical component toward the different directions, the reflector returning the light fluxes to said optical component; and
a reflection position control unit which controls a position of said reflector corresponding to a chromatic dispersion compensation amount,
wherein, said element of said optical component is made of a material having a refractive index higher than that of optical glass.

2. A chromatic dispersion compensator according to claim 1,
wherein the material used for said element has a refractive index higher than that of optical glass for the light having the wavelength of 1550 nm.

3. A chromatic dispersion compensator according to claim 1,
wherein said material of which said element of said optical component is made has a thermal expansion coefficient lower than that of optical glass.

4. A chromatic dispersion compensator according to claim 3,
wherein said material of which said element of said optical component is made has a refractive index temperature coefficient higher than that of optical glass.

5. A chromatic dispersion compensator according to claim 1,
wherein said material of which said element of said optical component is made is silicon (Si).

6. A chromatic dispersion compensator according to claim 1,
wherein said material of which said element of said optical component is made is zinc selenide (ZnSe).

7. A chromatic dispersion compensator according to claim 1,
wherein temperature of said optical component is controlled to be constant irrespective of a dispersion compensation amount.

8. A chromatic dispersion compensator according to claim 1,
wherein a curvature of a reflection plane of said reflector is smaller than the curvature of the reflection plane when said element is made of optical glass.

9. A chromatic dispersion compensator according to claim 1,
wherein the element of the optical component is a virtually imaged phased array (VIPA).

10. A chromatic dispersion compensator comprising:
a virtually imaged phased array (VIPA) including two parallel reflection planes opposing each other, in which incident light is multiply reflected between the two parallel reflection planes and a part of the incident light is emitted from one of the two parallel reflection planes, and light fluxes having different traveling directions are formed according to wavelengths by interference of the emitted light, said VIPA being made of a material having a refractive index higher than that of optical glass;

a reflector which reflects the light flux of each wavelength, the light fluxes being emitted from one of the two parallel reflection planes of the VIPA toward the different traveling directions, the reflector returning the light fluxes to the VIPA; and a reflection position control unit which controls a position of the reflector corresponding to a chromatic dispersion compensation amount.

* * * * *

UNITED STATES PATENT AND TRADEMARK OFFICE
CERTIFICATE OF CORRECTION

PATENT NO. : 7,646,982 B2  
APPLICATION NO. : 11/320426  
DATED : January 12, 2010  
INVENTOR(S) : Yasuhiro Yamauchi et al.

It is certified that error appears in the above-identified patent and that said Letters Patent is hereby corrected as shown below:

Column 14, Line 5, change "lights;" to --light;--.

Column 14, Line 35, after "made" change "is" to --of--.

Column 14, Line 39, after "made" change "is" to --of--.

Column 14, Line 42, after "wherein" insert --a--.

Signed and Sealed this

Thirtieth Day of March, 2010

David J. Kappos
*Director of the United States Patent and Trademark Office*